United States Patent [19]

Cicha

[11] Patent Number: 4,932,151
[45] Date of Patent: Jun. 12, 1990

[54] ROD JIGGING APPARATUS

[76] Inventor: Dan Cicha, N5514 Erickson Dr., Glen Flora, Wis. 54526

[21] Appl. No.: 396,032

[22] Filed: Aug. 21, 1989

[51] Int. Cl.$^5$ ............................................. A01K 97/10
[52] U.S. Cl. ...................................... 43/19.2; 43/26.1
[58] Field of Search ................ 43/19.2, 26.1, 15, 21.2, 43/25

[56] References Cited

U.S. PATENT DOCUMENTS

| | | | |
|---|---|---|---|
| 2,986,834 | 6/1961 | Irwin | 43/15 |
| 3,600,837 | 8/1971 | Bristol | 43/19.2 |
| 3,660,921 | 5/1972 | McDonnell | 43/15 |
| 4,251,939 | 2/1981 | Tiede | 43/19.2 |
| 4,581,840 | 4/1986 | Guith | 43/19.2 |
| 4,676,018 | 6/1987 | Kimball | 43/15 |

*Primary Examiner*—Richard K. Seidel
*Assistant Examiner*—James Miner
*Attorney, Agent, or Firm*—Douglas L. Tschida

[57] ABSTRACT

An assembly for supporting a plurality of fishing rods and automatically, independently pivoting each of said rods through an adjustable arc of travel, whereby a suspended fishing lure/bait rises and falls to attract fish. A support base includes a plurality of radially-projecting, pivotally-mounted rod supports which are coupled via length-adjustable linkages to one or more rotationally driven, eccentric means. An associated storage battery, controller and gear reduction assembly intermittently, variably applies power to induce a desired jigging action. A remote rod holder, power supply and linkage are also disclosed.

15 Claims, 3 Drawing Sheets

ROD JIGGING APPARATUS

BACKGROUND OF THE INVENTION

The present invention relates to fishing apparatus and, in particular, to a portable assembly including rotationally driven, eccentric means for pivoting a plurality of radially projecting rod supports.

Success in sport fishing, often requires that a lure or live bait be presented to the fish with an alluring movement. Such movement may be induced horizontally or vertically or as a combination of such movements. The general purpose of the movement however is to simulate a crippled or injured prey species, thereby attracting a predator species of fish, upon detecting movement, and inducing the attracted fish to strike at the bait.

Although movement may be readily induced in a bait during warm weather conditions, when the fisherman has almost unlimited mobility relative to the water, such mobility becomes limited in cold weather conditions, when the surface of the water freezes. That is, other than natural bait movement, as when using minnows, the fisherman is limited to a vertical jigging action.

For many northern climates, where numerous sports enthusiasts continue their fishing activities through the winter months and where regulations permit the use of three or more lines, lure or bait presentation becomes hampered through an inability to maintain movement at multiple baits. That is, the fisherman can only attend so many lines at one time. Even where however the fisherman is capable of manually controlling the movement of multiple rods, it is difficult to sustain such action over a lengthy period of time.

Applicant is aware of a variety of devices which have been developed to manually induce a jigging action at a single hand-held rod and line. One assembly comprises a hand held rod including a finger operated trigger member which manipulates the rod tip to induce flexion, without having to physically lift/lower the rod. Another comprises an unattended tip-up assembly wherein the line and bait are supported from a pivotal lever arm that includes a vane member which is positionable to induce a jigging action relative to surface wind conditions.

Still other assemblies of which Applicant is aware are disclosed in U.S. Pat. Nos. 4,660,317; 4,603,499; 4,280,295; 4,120,112; 2,758,407. Various of these devices are battery powered and include eccentrically driven supports for single lines or rods. Other assemblies disclosed in U.S. Pat. Nos. 4,081,922 and 3,665,633 support two lines and provide for rigid, interconnected linkages to achieve horizontal and vertical movement. The U.S. Pat. No. 3,655,633 also contemplates an arrangement of independent, fixed length rigid linkage arms. Nowhere, however, is an assembly disclosed which readily accommodates three or more lines to independently, vertically jig each line.

Applicant accordingly has developed an improved assembly which readily accommodates at least three fishing lines. It also does so in a fashion whereby the lines may be positioned at variable distances from one another with independently variable jigging actions relative to a single, battery powered drive source and eccentric.

SUMMARY OF THE INVENTION

It is accordingly a primary object of the present invention to provide a portable assembly capable of inducing a jigging action at multiple numbers of fishing lures/baits suspended at variable distances from a motive power source.

It is another object of the invention to provide an independently adjustable stroke action or travel at each lure/bait.

It is another object of the invention to support each of said lines from a support assembly which permits a selectable arc of travel for each line.

It is another object of the invention to provide remotely positionable rod supports which are displacable from a primary support including a motive power source.

It is another object of the invention to provide an assembly whereat drive power may be obtained from either a remote or a self-contained power source and whereby power is, intermittently applied to an eccentric actuator.

It is a further object to support each drive linkage in non-fouling relation to one another.

Various of the foregoing objects, advantages and distinctions of the invention are particularly to be found in one preferred embodiment which comprises a stationary platform having a plurality of tubular rod receiving supports pivotally coupled at a lower end to the platform. Two of the supports face in opposite directions and a third projects at an orthogonal angle thereto. Each support has an adjustable forward stop position. An upper end of each support is coupled to one end of a flexible, length adjustable linkage. An opposite end of each linkage is secured to a rotationally driven eccentric means which receives power from a battery powered rotary drive source.

The drive controller includes an eccentric portion having means for independently supporting each of the adjustable linkages, gear reduction means and drive power control means, whereby in combination drive power may be controllably applied to each of a plurality of rods supported therefrom.

Remotely positionable modular rod supports and an associated drive linkage are also disclosed which may be driven from the powered support. The modular supports may also be attached to the powered support.

Still other objects, advantages and distinctions of the invention will become more apparent hereinafter, upon reference to the following detailed description thereof with respect to various alternatively considered embodiments and the appended drawings. Before referring thereto, it is to be appreciated the variously considered and described embodiments are not exhaustive of all such embodiments. The description should accordingly not be strictly construed nor limited to only those particularly disclosed embodiments.

DESCRIPTION OF THE DRAWINGS

FIG. 1 shows an isometric view in partial cutaway of a three rod jigging assembly and.

DESCRIPTION OF THE PREFERRED EMBODIMENT

Figure 1:
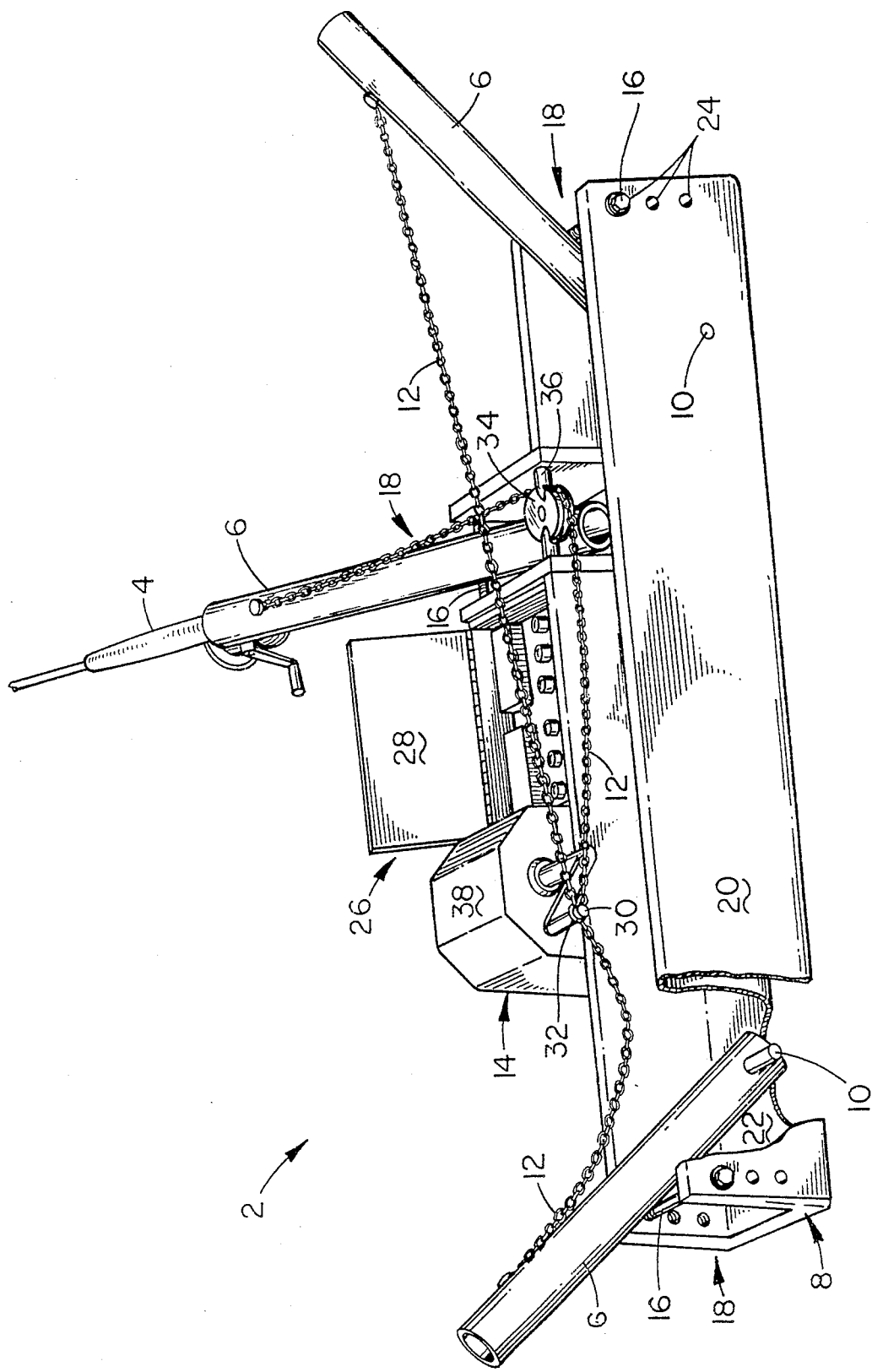

Referring to FIG. 1, an isometric view is shown of one assembly 2 of the present invention which is capable of simultaneously supporting and jigging three fishing rods. While only one of the fishing rods 4 is shown relative to the assembly 2, other fishing rods are separately supportable within the other provided tubular rod supports 6 which radiate from the stationary base station 8. Each of the supports 6 is pivotally mounted to the base 8 via independent pivot pins 10 that are secured to the lower end of each tubular support 6 and the walls of the base station 8.

Otherwise, a chain linkage member 12 extends from an upper end of each rod support 6 and is secured to an intermediate eccentric assembly 14. Each chain linkage 12 is independently length adjustable, which relative to the eccentric assembly 14 induces a selectable arc of travel at each rod support 6.

The travel arc of each rod support 6 is further effected by a number of adjustable stop pins 16 that are provided in the base station 8. That is, a number of partitioned compartments 18 defined via vertical side walls 20 that extend upwardly from a flat platform. Although the height of the side walls 20 at each compartment 18 are shown to be the same, they may vary from compartment to compartment. Similarly, the compartment sections can be modularly constructed to support one or two rods and be attachable to each other and/or the eccentric assembly 14 or be used independently. In that regard, FIG. 1 shows a two rod compartment 18 which detachably mounts to a unitary eccentric assembly 14 and battery compartment 26 and from which projects at ninety degrees a further single rod compartment 18. The details of such a modular construction will become more apparent below.

As importantly, however, is that a number of holes 24 provided at the end of each compartment 18 permit a variable positioning of individual stop pins 16. Depending upon the height of each pin, one travel extreme is fixed for each holder 6. The other travel extreme is established via the length of each linkage 12.

While the base station 8 is preferably constructed of a molded plastic, it alternatively can be fabricated from a variety of materials using suitable fasteners, adhesives etc. Such materials should be able to withstand the intended use and types of temperatures. Where too a battery compartment 26 with or without a hinged lid 28 is provided, consideration should be given to the weight and possible acid spillage. Thus, various plastics and formed metals are preferred over wood. Suitable knockouts or cuts can also be made in the compartment sidewalls 20 to attach other compartments 18.

Extending from the body of the eccentric assembly 14 is a crank arm 30. Each of the linkages 12 are separately coupled to the arm 30 such that as the arm 30 rotates, the linkages 12 merely follow the arm 30. Presently, a common washer or ring 32 is loosely secured to the end of each linkage 12 and about the arm 30. As the arm 30 rotates, the ends of the linkages 12, thus slip about the ring 32 and the ring 32 about the arm 30, as opposed to being wound about the arm 30.

At the same time, the rod supports 6 are pulled toward the arm 30, due to a contained motor drive, or fall away from the arm 30, due to the weight of the support 6 and rod 4. Although a single arm 30 is shown, multiple arms of either a rigid or an articulating construction might be employed so as to each rotate with applied drive power, but without obstructing each other.

Referring to the center rod support compartment 18, its associated linkage 12 is passed about a pulley member 34 which is secured to the base station 8 via an axle pin 36. As the arm 30 rotates, the relative motion of the linkage 12 is diverted via the pulley 34 to an angle at 90 degrees to the other rod holders 6. Other angular orientations may equally be accommodated with the aid of still other free pivoting pulleys 34. Similarly, yet other rod support compartments 18 might be mounted to the base station 8, provided they are offset from eccentric assembly 14.

Figure 3:
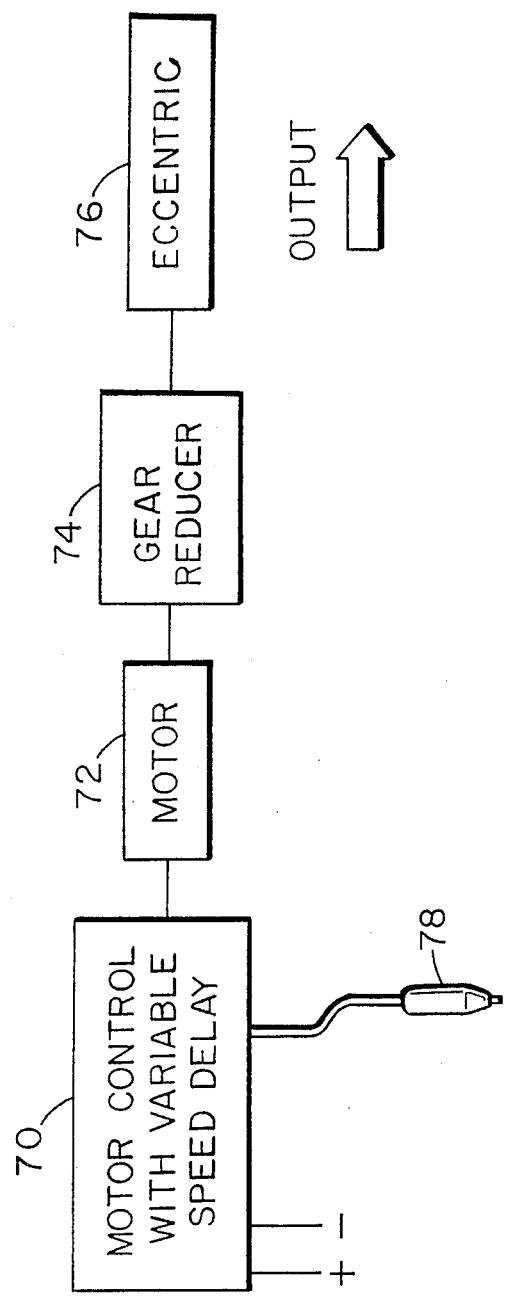
FIG. 3 shows a block diagram of the drive control assembly of the invention.

For the embodiment of FIG. 1, each rod support 6 is driven via a D.C. motor (reference FIG. 3) which mounts within the compartment portion 38 of the eccentric assembly 14. The arm 30 is, in turn, coupled to the drive shaft of the motor. The motor is driven via the storage battery 26 or an external battery, as from a nearby vehicle via appropriate leads and connectors or an auxiliary plug-end 78.

As necessary, the drive shaft of the motor can be secured to a gear reduction assembly 74 (reference FIG. 3) that interconnects with the eccentric assembly 14. Alternatively and depending upon the numbers of rod supports 6 to be accommodated and the type of motor and eccentric assembly 14, the gear reduction assembly 74 may deleted. In lieu also of a constant drive motor, a variable drive motor might be employed to vary the rate of oscillation at each rod 4. A non-uniform coupling to the eccentric assembly 14 may also be used, such as where the end of one or more linkages 12 are allowed to periodically stall relative to the travel of the crank arm 30, and thereby induce an erratic action at the lure.

In the latter regard, either a simple rheostat or an intermittent controller assembly 70 can also be used to supply power to the motor and control the speed of its rotary motion. That is, a reheostat might be used where it is preferable to produce a jigging action of a constant predetermined frequency. An intermittent controller might be used where it is desirable to periodically vary the action, such as by intermittently driving the motor with pulses of power of variable duration. For example, a turn signal controller such as used on most motor vehicles, might be employed as the controller 70 to intermittently interrupt power to the motor, thereby stopping/starting the jigging action. A more natural and erratic action is thereby imparted to a lure/bait suspended from the rod 4.

Whereas also the rod support compartments 18 of FIG. 1 can be molded as a unitary structure, they might comprise compartments which are modularly added to one another to project in variously desired directions.

Figure 2:
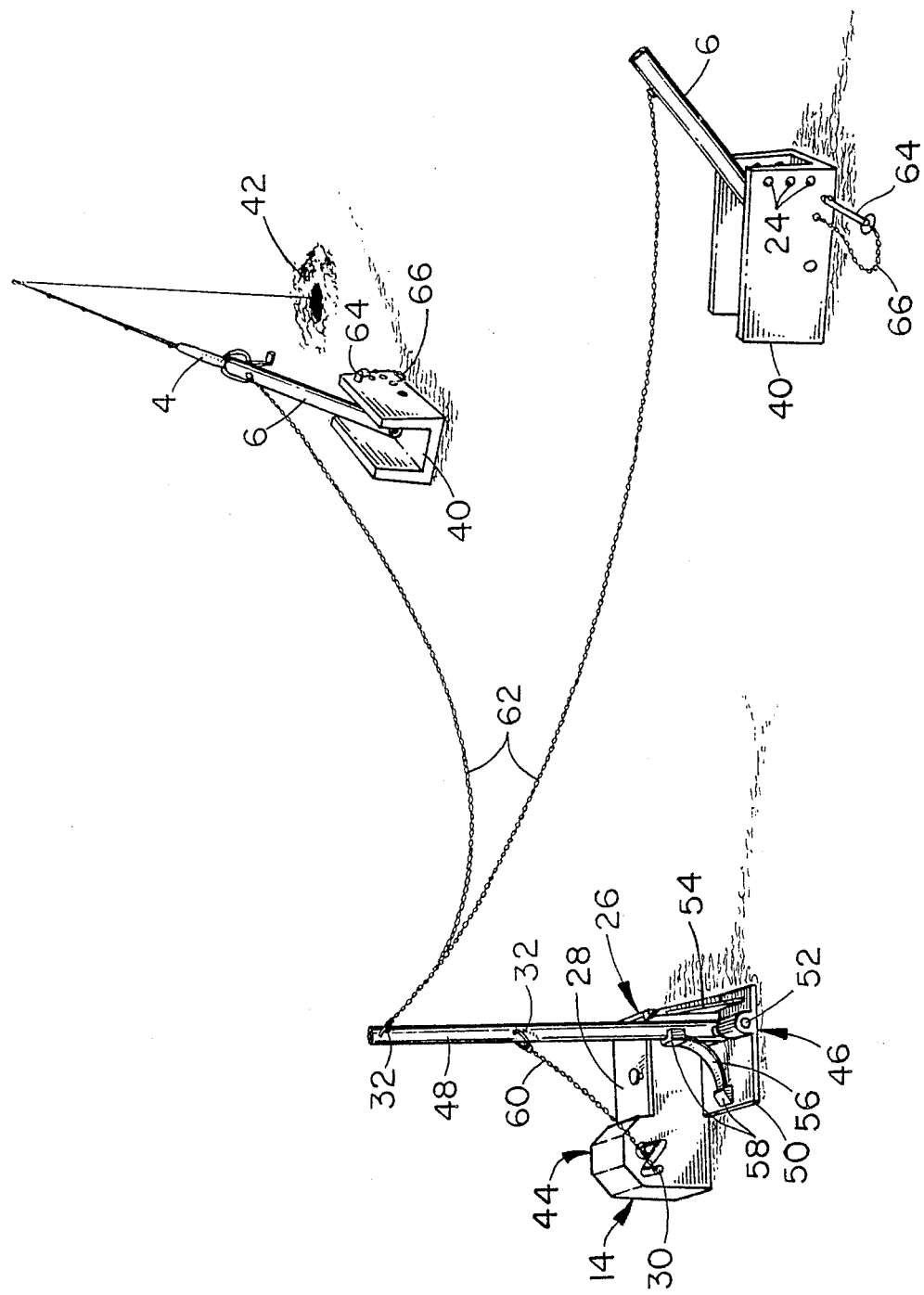
FIG. 2 shows an isometric view of an alternative powered single support relative to a plurality of remotely positioned supports.

FIG. 2 depicts yet another alternative rod mounting arrangement including a number of remotely mounted rod support stations 40 which are positioned at displaced locations and fish holes 42 from a master location and driver station 44.

For this arrangement, the driver station 44 essentially comprises the eccentric assembly 14 and battery compartment 26, without any rod support compartments 18. Compartments 18 can however be added as desired, such as by arranging and securing the single rod support compartments 40 to the driver station 44 via appropriate fasteners. A two rod support might also be configured by mounting two single rod support compartments in end-to-end relation to each other. Third and fourth rod support compartments 18 with pulleys 34 might also be mounted to project at ninety degrees to the driver station 44, in the fashion of the center compartment 18 of FIG. 1. For purposes of clarity, however, no rod support compartments 18 are shown relative to the driver station 44.

The driver station 44 otherwise includes a vertical upright member 48 which is pivotally secured to the base platform 50 via a cooperating axle 52. The axle 52 is secured within mating raised portions 54 of the platform 50. A leaf spring 56 is secured under tension to the base member 50 and to the upright 48 at appropriate catch protrusions 56. The upright 48 is thereby biased in one direction, in much the same fashion as the weight of each fishing rod 4 and rod support 6 biases each support 6 relative to the eccentric arm 30.

A relatively short secondary chain linkage member 60 is secured between the crank arm 30 and the center of the upright 48 at separate rings member 32. A pair of relatively longer linkage members 62 extend from another ring 32 mounted to the upper end of the upright 48 and to the upper ends of each rod support 6 at each of the remote stations 40. Thus, as the crank arm 30 rotates, the motion is transferred via the linkage 60 and upright 48 to the linkages 62 and thence to the rod supports 6 at each remote station 40.

A desired vertical jigging heighth is further induced at each remote site by appropriately adjusting the stop pins 64 at each remote station 40. Whereas too the stop pin 16 in FIG. 1 took the form of bolts, FIG. 2 discloses spring biased detent type pins 64 which capture the pins 64 to the holders 40, upon being inserted through the apertures 24. Otherwise, each pin 64 is restrained to its holder 40 via a short tether 66 so as not to become lost.

From the foregoing it is thus to be appreciated that an automatically controlled jigging action might be obtained at a large number of fishing rods from a single drive source. Such rods may either be relatively closely mounted to one another or remotely displaced from each other. The drive action can be adjusted by varying the travel arc of the linkage to each fishing rod 4. Alternatively and from FIG. 3, the controller circuitry 70 can be constructed to provide an intermittent (,as opposed to a constant,) drive action to further induce an erratic and/or intermittent jigging action at each supported lure/bait. Slippage may further be incorporated into each linkage at desired travel positions to augment the erratic lure action.

While the foregoing invention has been described with respect to various of its presently preferred embodiments, still others may suggest themselves to those of skill in the art. Accordingly, it is contemplated the following claims should be interpreted to include all those equivalent embodiments within the spirit and scope thereof.

What is claimed is:

1. Fishing rod support apparatus comprising:
   (a) a plurality of means for each supporting a fishing rod in vertical projection relative to a pivot axis and wherein each of said rod support means is pivotally secured to a base member to vertically project therefrom;
   (b) a plurality of length adjustable means each comprising a length adjustable member secured to one of said rod support means in displaced relation to the pivot axis of each rod support means; and
   (c) means including an eccentric portion secured to each of said length adjustable means for inducing an oscillatory motion at each of said rod support means.

2. Apparatus as set forth in claim 1 wherein said eccentric portion includes a crank arm and ring means slidably mounted to said crank arm and each of said length adjustable means.

3. Apparatus as set forth in claim 2 wherein each of said length adjustable members comprises a linked chain.

4. Apparatus as set forth in claim 3 wherein at least one of said rod support means projects at an angular displacement to a plane of travel of said eccentric portion and includes a pulley member about which at least one of said lengths of chain is trained.

5. Apparatus as set forth in claim 4 including means for intermittently applying power to said eccentric portion whereby a non-periodic motion is induced in each of said rod support means.

6. Apparatus as set forth in claim 1 wherein each rod support means includes a base member including a plurality of vertical side walls having an axle member disposed therefrom, a tubular rod holder being pivotally mounted about said axle, and limiting means for limiting the forward motion of said rod holder.

7. Apparatus as set forth in claim 6 wherein ones of said base members are detachably securable to each other.

8. Apparatus as set forth in claim 1 including an upright member pivotally secured in offset relation to said eccentric portion and having a secondary length adjustable member coupled therebetween.

9. Apparatus as set forth in claim 8 including means for spring biasing said upright member.

10. Apparatus as set forth in claim 8 including a rod support means remotely located from said eccentric portion and including one of said length adjustable members extending from said upright member to the remotely located rod support means.

11. Apparatus as set forth in claim 1 including means for inducing a non periodic rotational movement of said eccentric portion.

12. Apparatus as set forth in claim 1 including means for coupling a battery source to a D.C. motor and further including gear reduction means coupling said motor to said eccentric portion.

13. Fishing rod support apparatus comprising:
   (a) a plurality of tubular members, wherein each member is pivotally secured to an axle to vertically project from a stationary base platform;
   (b) means for adjustably limiting a forward motion of each tubular member;
   (c) a plurality of chain members, each secured to one of said tubular members in displaced relation to a pivot axis of each tubular member; and
   (d) a battery powered motor coupled to a crank arm and ring means slidably mounted to said crank arm and each of said chain members for inducing an oscillatory motion at each of said rod support means.

14. Fishing rod support apparatus comprising:
   (a) a plurality of compartments wherein each compartment includes means pivotally secured thereto for vertically supporting a fishing rod and means for adjustably limiting a forward motion of said rod support means;
   (b) a plurality of length adjustable means each comprising a length adjustable member secured to one of said rod support means in displaced relation to a pivot axis of each rod support means; and
   (c) a battery powered motor coupled to an eccentric portion and means slidably mounted to said eccentric portion and each of said length adjustable means for inducing an oscillatory motion at each of said rod support means.

15. Apparatus as set forth in claim 14 including an upright member pivotally secured in offset relation to said eccentric portion and having a secondary length adjustable member coupled therebetween and including the length adjustable member extending from said upright member to a remotely located compartment and rod support means.

* * * * *